United States Patent [19]

D'Amelia et al.

[11] Patent Number: 4,525,363
[45] Date of Patent: Jun. 25, 1985

[54] SINGLE COMPATIBILIZING AGENTS FOR ELASTOMER-RESIN COMBINATION GUM BASE

[75] Inventors: Ronald P. D'Amelia, Hicksville, N.Y.; John J. Stroz, Monroe; Roy White, Somers, both of Conn.

[73] Assignee: Nabisco Brands, Inc., Parsippany, N.J.

[21] Appl. No.: 509,262

[22] Filed: Jun. 29, 1983

[51] Int. Cl.$^3$ .............................................. A23G 3/30
[52] U.S. Cl. .................................................. 426/3; 426/6
[58] Field of Search ................................... 426/3-6

[56] References Cited

U.S. PATENT DOCUMENTS

| | | | |
|---|---|---|---|
| 2,273,425 | 2/1942 | Traylor | 426/4 |
| 2,284,804 | 6/1942 | De Angelis | 426/6 |
| 2,366,672 | 1/1945 | Mustin | 426/6 |
| 2,662,016 | 12/1953 | Merz et al. | 426/6 |
| 3,285,750 | 11/1966 | Ishida et al. | 426/6 |
| 3,297,450 | 1/1967 | Wing | 426/6 |
| 3,311,595 | 3/1967 | Kahrs et al. | 426/6 |
| 3,440,060 | 4/1969 | Rife et al. | 426/6 |
| 3,473,933 | 10/1969 | Sato et al. | 426/6 |
| 3,930,026 | 12/1975 | Clark | 426/3 |
| 4,241,091 | 12/1980 | Stroz et al. | 426/4 |

FOREIGN PATENT DOCUMENTS 428736  6/1975  U.S.S.R. .................. 426/3

*Primary Examiner*—Jeanette Hunter
*Attorney, Agent, or Firm*—Richard Kornutik

[57] ABSTRACT

A chewing gum containing a new homogeneous gum base and a process for the preparation thereof wherein the gum base includes a single polymeric compatibilizing agent which is capable of properly plasticizing both the resin and the elastomer components contained therein. The primary components are made effectively compatible with each other by use of the novel agents.

18 Claims, No Drawings

SINGLE COMPATIBILIZING AGENTS FOR ELASTOMER-RESIN COMBINATION GUM BASE

BACKGROUND OF THE INVENTION

The present invention relates to the art of chewing gums and, in particular, to a novel chewing gum base composition in which the resin and elastomeric components of the base are compatibilized by a single polymeric compatibilizing agent.

Chewing gums generally contain two distinct constituent parts, a water-soluble portion which is dissipated in the oral cavity during chewing and a base portion which is inert and essentially insoluble in water and is retained in the mouth throughout mastication.

The present invention is concerned with the base portion of the gum and the materials of which it is composed. These materials are critical in effecting the properties and characteristics of the chewing gum which are determined by the intended utility of the gum.

Presently, chewing gum bases are made of two primary components which have been considered essential in producing the desired gum base characteristics, a resinous material and an elastomeric material, either of which may be of natural or synthetic origin or even combinations of both.

The elastomer component generally provides an insoluble bulking constituency with resiliency to recover from deformation caused by chewing.

The resinous base component is determinative of other characteristics and usually must satisfy more than one requirement. Primarily the resinous component must impart a permanent chewability to the gum base, i.e., resistance to the stiffening and poor taste which is usually evident upon continued mastication of a chewing gum product. Further, the resin must be non-toxic, odorless, tasteless, hydratable, somewhat elastic, economical, insoluble in water, resistant to decomposition and embrittlement upon aging, capable of maintaining flavor and resistant to formation of toxic products.

Although synthetic resins, such as polyvinyl acetate, which impart many improvements to the chewing gum, have currently replaced chicle and other natural resins which were utilized in the past, these synthetic resins are nevertheless generally characterized by a need to have their plasticity and chewing properties improved. Furthermore, combining the elastomer component with a resinous material has proven somewhat difficult in that these components exhibit little if any, miscibility, solubility and/or compatibility with one another. Overcoming this problem has been shown to be essential in the preparation of a stable homogeneous gum base. This problem is compounded by the addition of other components which are required to effect different desired characteristics to the resulting chewing gum. Addition of these other components while maintaining proper resiliency throughout mixing is also known to be problematic, but necessary in order to achieve a desired homogenous insoluble phase of the chewing gum.

Both elastomers and polymeric resins inherently have a characteristic intensity of intermolecular interaction called cohesive-energy density, which, in general, must be overcome to some extent to achieve compatibility between these two components. Attractive forces between organic molecules which account for the characteristic cohesive-energy density include among other forces, Van der Waals forces, dispersion forces, dipole induced dipole forces, and acid base forces, of which the most important is hydrogen bonding. Authorities have referred to various criteria for compatibility, i.e., clarity, heat capacity (merging of separate glass transition, $T_g$, peaks or melting points), X-ray scattering, thermal expansion vs. temperature and dielectric or mechanical measurements. However, many of these criteria are not altogether reliable. Indeed, while much of the early literature is too subjective, more recent references may be considered overly vigorous.

Thus, while predicting blend compatibility has not been reduced to an exact science, solubility parameter methods have been found useful because there is significant data available. A Hildebrand solubility parameter, $\delta$, is an expression of the cohesive energy density of a particular substance which is defined as the square root of the energy of vaporization per unit volume of material. Thus, the solubility parameter is proportional to the cohesion of the material or the strength of attraction between the molecules making up the material. In theory, the miscibility of polymers relates to those having comparable solubility parameters. In the case of low molecular weight substances, one would expect miscibility if the solubility numbers are within 5–9 units of each other. Polymeric substances are more difficult. For example, a solubility parameter member difference of 0.5 may be too much at 5,000 MW for both polymers or ever 0.15 difference may be too much of a difference at 50,000 MW. Generally, however, compatibility is considered possible between those polymers having a difference in solubility parameters of less than 1.7 to 2.0, S. Krause, "Polymer Capability," J. Macromal. Sci-Macromal Chem C7, pgs. 251–314 (1972).

While it is known that straight mechanical shearing may be used to intimately contact polymers having disparate chemical and structural properties, such methods may also depolymerize the components thus destroying desired inherent polymeric properties such as memory, elasticity, and film-forming capabilities, i.e., relative displacement without rupture of intermolecular bonding. To overcome these problems different ingredients have been used in an attempt to compatibilize resins and elastomers externally without total depolymerization while maintaining all the properties for which the other ingredients have been intended.

In particular, certain plasticizers have been employed to effect proper external plasticization of each primary components of the gum base, i.e., the resin material and the elastomer component, and to increase the solubility, miscibility, and compatibility of these two components during preparation, production, and chewing. In order to eliminate the need for individual compatibilizers for each of the primary components, it has been the goal of work in the gum base art to use a single external compatibilizer to achieve an adequately plasticized gum base formed from an elastomer and a resin.

It is therefore an object of the present invention to provide a single compatibilizing agent which is capable of properly plasticizing both the resinous and the elastomeric components of a gum base.

It is another object of the present invention to provide a homogeneous polyblend gum base containing a single compatibilizing agent which resists migration from the base.

It is still another object of this invention to provide a chewing gum containing the aforementioned homogeneous polyblend gum base.

A still further object of this invention is provide a process for the preparation of a chewing gum containing the aforementioned homogeneous polyblend gum base.

For a better understanding of the present invention, together with other and further objects, reference is made to the following description, and its scope will be pointed out in the appended claims.

SUMMARY OF THE INVENTION

The present invention relates to a homogeneous gum base composition and a method for preparing same by use of a single compatibilizing agent which is capable of affording both the resin and the elastomer gum base components a degree of miscibility sufficient to make them sufficiently compatible for the purpose of functioning as a gum base useable in a chewing gum composition. It is contemplated that the homogeneous gum base of the invention will also include other normal gum base components such as fillers, emulsifying agents, softening agents, texturizing agents, waxes and mixtures thereof.

As one would expect, the elastomers contemplated for use in the present gum base include, among others, the synthetic elastomers, sytrene-butadiene rubber (SBR), polyisobutylene (PIB), polyisoprene, isoprene-isobutylene copolymer, whereas the resin generally regarded for use in preferred embodiment of the invention is polyvinyl-acetate, especially high molecular weight polyvinylacetate, i.e., having a M.W.U. of at least about 20,000.

A preferred embodiment of the invention as presently contemplated includes a single polymeric compatibilizing agent for both resin and elastomer which has a solubility parameter about one-half the sum of the solubility parameters of the resin and the elastomer, that is the numerical value of the solubility parameter of the compatibilizing agent is generally between the numerical value of the solubility parameters of the resin and elastomer. For present purposes, polymeric is considered to include substances having multiple molecular repeat units, such as oligomers, which are characterized as having low vapor pressure and high boiling point, being non-volatile, and, in general, non migrating when in composition with other components.

To date resins and elastomers having a solubility parameter of between about 7 and 12 have been found to be particularly useful.

In particular, compatibilizing agents considered effective for use herein include polymers having a solubility parameters with a value between that of the elastomer and resin.

The method contemplated for forming the present gum base includes contacting the resin and elastomer, and, optionally, other gum base components in the presence of a compatibilizing agent, followed by mixing the components. In the event other gum base components are not added as the primary components are contacted with each other, the additional base components can be introduced after mixing the primary components.

Based upon conventional principles of plasticization, it was heretofore believed that each of the primary components of an elastomer-resin combination gum base required a separate agent to effect proper compatibility between these primary components. Furthermore, other agents were required to provide the desired characteristics to the gum base, e.g., proper texture, chewability, resiliency, and flavor retention. Up to now it has not been considered feasible to employ a single phase compatibility agent which would affect all the required and intended properties in an elastomer-resin combination gum base.

Thus, among all the advantages of the present invention, it has surprisingly been discovered that a single polymeric compatibilizing agent may be provided for an elastomer-resin combination gum base, in the absence of any additional internal plasticization or external plasticizing agent, to effect sufficient plasticization of each of the primary components to attain satisfactory compatibility between them. Additionally, other materials can be provided to impart other desired characteristics in this novel chewing gum base.

DETAILED DESCRIPTION OF THE INVENTION

According to the present invention, a polyblend gum base is contemplated which is formed from two primary components, one of which is a resinous material such as, for example, polyvinylacetate. This resinous component may be present within a range from about 5 to about 75 weight % of the gum base, or preferably, from about 20 to about 50 weight % of the gum base. The other primary component is an elastomeric material such as, for example, styrene-butadiene rubber (SBR), polyisobutylene rubber (PIB), polyisoprene and isoprene-isobutylene copolymers and/or mixtures thereof. Preferred elastomers are styrene-butadiene copolymer and polyisobutylene. Other masticatory substances of natural original may be employed as the elastomeric component of the present gum base such as, for example, rubber latex solids, chicle, crown gum, nispero, rosidinha, jelutong, pendare, perillo, niger gutta, tunu and the like and mixtures thereof. The elastomer material may be included in the gum base within a range from about 3 to about 30 weight %, preferably from about 10 to about 20 weight %.

Optionally, the gum base of the present invention may contain other agents for emulsifying, softening, texturizing and/or for imparting other intended properties to the resulting gum base. These may include all other adhesive and nonadhesive-type components generally employed in a gum base such as, for example, fillers such as calcium carbonate or talc, and/or waxes, natural or synthetic and hydrocarbon or ester types, fatty acids and fatty acid esters, antioxidants, oils, ester gum/polyterpene resins and the like. Optionally, fillers such as calcium carbonate and talc, and/or wax can be included to achieve a desired result.

The primary resin component used in the present invention is preferably a high molecular weight polyvinylacetate of at least about 20,000 M.W.U. This is especially preferred where the gum base is to be employed in a bubble gum composition. Other resins which may be employed herein depend upon the properties desired to be obtained in the resulting gum base and may include polyvinylbutyl ester, copolymers of vinyl esters and vinyl ethers, polyethylene-vinylacetate copolymers, vinylacetate-vinyl alcohol copolymers and vinylacetate-vinyl laurate copolymers.

While the present invention is not to be considered limited in any way as a result of theories advanced with regard thereto, it is believed that a certain level of consistency may be provided for predicting compatibilizing agents which optimally perform with particular resins, elastomers and/or their combinations. Solubility parameters have proved particularly useful in these predictions. These solubility parameters are generated by a number of physical methods and may be calculated based upon a number of mathematical expressions. Although there are different methods of calculation and some disadvantages inherent in each, most of the published solubility parameters of solvents are based upon heat of vaporization data as described, for example, by Burrel in the publication "Solubility Parameters For Film Formers", *Official Digest*, 27, No. 369, p. 726 (October, 1955). A typical calculation is represented, for example, by the formula:

$$\delta = \left[ \frac{H \text{ Vaporization} - R \times T(°K.)}{\text{Molar Volume (MW/Density)}} \right]^{\frac{1}{2}}$$

e.g., Anisaldehyde: $=[(13,581.8-580)/136.14/1.119]^{\frac{1}{2}}=10.3$

For polymers, most of the published data is determined by solution viscosity in solvents of known solubility parameter and hydrogen bonding capacity by determining the highest viscosity-producing solvent. For crosslinked polymers, weight gain in various solvents is utilized determining the solvent producing the highest weight gain. Where no data is available, solubility parameters may be calculated, for example, according to the publication by Fedors, "A Method For Estimating Both Solubility Parameters and Molar Volumes of Liquids", *Polymer Engineering and Science*, 14, No. 2, p. 147 (February 1974). For the purposes of the present invention this method for calculation is preferred as a basis for comparison.

Based upon the aforementioned theory and the calculation derived therefrom, it has been determined that in order to properly effect compatibility of the primary components by a single compatibilizing agent for the purposes of the present invention, the compatibilizing agent should have a solubility parameter between the solubility parameter of the elastomer component and the resin component of the gum base. Preferably, the plasticizing agent has a solubility parameter at the approximate midpoint of the solubility parameters of the elastomer and resin employed in the gum base.

Polymeric compatibilizing agents which are believed to be capable of properly plasticizing the primary components of the resin-elastomer combination gum base as described hereinabove are as follows:

Polybenzyl Methacrylate; Polybutyl Methacrylate; Polyethyl Methacrylate;
Polybutadiene (Diol and Phenyl Terminated Types);
Polybutyl Acrylate;
Poly (1,4 butylene Adipate); Polyethylene adipate;
Poly caprolactone (Diol and Triols);
Polypropylene glycol monomethacrylate;
Polyethylene glycol methyl ether;
Poly (2-hydroxypropyl Methacrylate); Polyisobutyl Methacrylate;
Polyvinyl butyrate;
Polyvinyl ethyl ether; Polyvinyl isobutyl ether;
Polyvinyl laurate; Polyvinyl stearate;
Ethylene-Vinyl Acetate Copolymer;
Vinyl alcohol-Vinyl Acetate Copolymer;
N-Vinylpyrrolidone-Vinyl Acetate Copolymer;
Polyvinyl Acetate-Polyvinyl Laurate Copolymer;
Vinyl Acetate-di-n-butyl Maleate Copolymer;
Polyethylene Phthalate; Poly Dialty Phthalate;
Styrene/Isoprene (ABA Block) Copolymer;
Styrene/Ethylene-Butylene (ABA Block) Copolymer;
Ethylene/Propylene/Diene-Terpolymer;
Ethylene/Propylene Copolymer;
Acrylonitrile/Butadiene Copolymer
Acrylonitrile/Butadiene/Styrene Resin;
Poly (Butadiene-co-Acrylonitrile) Diol;
Styrene/Butyl Methacrylate Copolymer;
Poly (1 butene);
Polybutenes
alpha-Hydro-omega-hydroxy-poly oxyethylene-poly oxypropylene polyoxyethylene Block Copolymer (Poloxamer);
Silicone/Modified Silicones;
Poly Vinyl Polypyrrolidone (PVPP);
Ethyl Cellulose/Cellulose;
Crosslinked polyvinyl acetate;
and mixtures thereof.

When employing a resin-elastomer combination of polyvinylacetate and styrene-butadiene rubber the preferred compatibilizing agents are ethylene-vinyl acetate; vinyl acetate-vinyl laurate copolymer; vinyl alcohol-vinyl acetate copolymer; polycaprolactone diols and triols; polyvinyl butylether; polypropylene glycol monomethacrylate and glutarate; poly-1,3-polybutylene; glycol adipate; polybutene; polyesters; and polypropylene glycol azelate.

When using a combination of polyvinylacetate and polyisobutylene the preferred compatibilizing agents are ethylene-vinyl acetate copolymer; vinyl acetate-vinyl laurate copolymer; ethylene propylene copolymer; ethylene propylene diene terpolymer; polycaprolactone diols and triols; and polybutenes; and if the elastomer is isobutylene-isoprene copolymer, the preferred compatibilizing agents include polylimonene; ethylene propylene copolymer; ethylene-vinyl acetate copolymer; and polybutenes.

The compatibilizing agents employed herein may be present in an amount from about 0.5 to about 50 weight % of the gum base and preferably from about 3 to about 28 weight % of the gum base. Particularly preferred is a gum base composition having a resin:elastomer:compatibilizer ratio [by weight] of 3:1:0.5–2.0.

Surprisingly, employment of these compatibilizing agents in a resin-elastomer combination gum base eliminates the need for additional internal and external plasticizers to effect proper plasticization of each of the primary components and satisfactorily renders the resin and the elastomer components compatible with one another. It will be appreciated, nevertheless, that a certain amount of ingredients such as ester gums, fillers, waxes, emulsifiers and colorants may be included in the gum base to achieve certain desired properties without detracting from the overall effect of the present invention.

The fillers which can be used in the present gum base in an amount ranging from 0 to about 60% and preferably ranging from about 5 to about 45% by weight of the gum base. Examples of fillers suitable for use include, but are not limited to, calcium carbonate, aluminum hydroxide, alumina, magnesium carbonate, dicalcium phosphate, talc ($3MgO.4SiO_2.H_2O$), magnesium trisilicate, magnesium hydroxide, aluminum silicates, silica gel, organic fillers and combinations thereof. Calcium carbonate is preferred. However, where acid flavors and/or acid sweeteners, such as the free acid form of saccharin, acid cyclamate or aspartame, are employed in the final chewing gum it is preferred to employ a non-chalk filler, preferably talc.

The gum base of the invention can also include waxes which serve as lubricants and should have a melting point of above about 35° C. and preferably above about 50° C. Examples of such waxes include candelilla wax, carnauba wax, ozokerite, oricury, microcrystalline wax, refined paraffin wax and the like. The waxes will be employed in an amount within the range of from about 1 to about 18% by weight of the gum base, and preferably from about 3 to about 12%. The preferred waxes are microcrystalline wax and paraffin wax employed in combination so that from about 0 to about 18% (based on the weight of the gum base) of the paraffin wax. The waxes are found to reduce the tackiness of the final gum composition without significantly reducing cohesivity thereof.

The base of the invention can also include a softening agent and lubricant combination which may comprise one or more hydrogenated vegetable or animals fats having a melting point that is above about 22° C., and preferably above about 40° C., such softening agent and/or lubricant may be employed in amounts ranging from about 0 to about 10% by weight of the gum base, and preferably from about 0.5 to about 7%. Examples of softeners suitable for use herein include, but are not limited to, glyceryl monostearate, lecithin, coconut oil, fatty acids, such as stearic, oleic and palmitic, partially hydrolyzed polyvinyl esters, waxes, such as beeswax and those previously mentioned, cellulose derivatives, and mono-, di- and tri-glyceryl esters of fatty acids as described hereinbefore.

An emulsifier can also be included to impart hydrophilic/hydrophobic balance to the gum base so that saliva will be absorbed thereby making the gum base slippery; the emulsifier will be employed in amounts ranging from about 0 to about 10% by weight of the gum base, and preferably from about 3 to about 9%. Examples of such emulsifiers include mono, di-, and tri-glyceryl stearates, eolates, and palmitates, phosphatides, such as lecithin and cephalin, Tweens, Spans and mixtures thereof.

In addition, the gum base can include colorants/pigments, such as titanium dioxide, and anti-oxidants (when necessary to stabilize non-inventive ingredients) in an amount up to 1000 ppm of the gum base, such as butylated hydroxyanisole, butylated hydroxytoluene, and propyl gallate.

The following is a general gum base formulations in accordance with the present invention.

| Formulation I | % by Weight of Gum Base |
|---|---|
| Elastomer Component | |
| Elastomer - Sytrene-butadiene copolymer or polyisobutylene | 3.0 to 30% |
| Resin Component | |
| Resin - Polyvinylacetate (M.W. Greater than 20,000) | 5 to 75% |
| Compatibilizing Agent | |
| Polymeric material | .5 to 50% |
| Optional Third Component(s) | |
| Filler (CaCo3 or Talc) | 0 to 60% |
| Waxes | 0 to 18% |
| Texturizing/Emulsifying Agents | 0 to 10% |

It will be appreciated that in the above formulation where a unique compatibilizing agent is employed with the resin and elastomer, an ester gum or other tackifying plasticizer and/or additive may optionally be employed. However, the amounts of ester gums or other tackifying plasticizers and/or additives employed in such cases will be relatively small so that the gum base produced may be maintained as substantially non-tacky, and are not required to effect of the resin-elastomer components nor are they required to effect compatibility among the constituents. Examples of ester gums which may optionally be present herein comprise hydrogenated ester gum, that is, glycerol ester of hydrogenated resin and/or dimerized ester gum, pentaerythritol ester, polymerized ester gum and ester gum. The ester gums may be employed in an amount ranging from about 0 to about 10%, preferably from about 2 to about 7% by weight of the gum base.

In any event, the gum bases of the invention may be formed by contacting each of the primary components and either simultaneously or thereafter combining other components to form gum base.

The gum base of the invention may be employed in forming a chewing gum and in such case the gum base will be present in an amount within the range of from about 10 to about 40% preferably from about 15 to about 30% by weight of the chewing gum.

The chewing gum of the invention may be of the sugar-containing or sugarless variety. Examples of sweeteners which may be employed include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitol, mannitol, xylitol, mixtures thereof, as well as hydrogenated starch hydrolysates or isomaltitol, and mixtures of two or more of the above-sugars and/or sugar alcohols.

Any of the above sugars may be present in an amount of within the range of from about 0.05 to about 90% and preferably from about 40 to about 85% by weight of the chewing gum. The sugar alcohols, where present, will be employed in an amount of from about 0.05 to about 90% and preferably from about 40 to about 85% by weight of the chewing gum.

The chewing gum of the invention may also contain in lieu of or in addition to any of the above sugar or sugar alcohols an artificial sweetener, such as, for example, aspartame, cyclamate, or a saccharin or other sweetener as set out hereinafter, the artificial sweetener being present in an amount of from about 0 to about 1.5% by weight, and preferably, from about 0.05 to about 0.3% by weight of the chewing gum.

Examples of artificial and natural sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester (aspartame), the sodium, ammonium or calcium salt of 3,4-dihydro-6-methyl-1,2,3,4-oxathiazine-4-one-2,2-dioixde, the potassium salt of 3,4-dihydro-6-methyl-1,2,3-oxathiazine-4-one-2,2-dioxide (Acesulfame-K), as well as *Thaumatoccous daniellii* (Thaumatin I and II), *Stevia rebaudiana* (Stevioside), *Richardella dulcifica* (Miracle Berry), *Dioscorephyllum cumminsii* (Serendipity Berry), cyclamate salts, and the like, or mixtures of any two or more of the above.

The chewing gum of the invention may include flavoring, such as sour or fruit flavoring or non-acid or mint flavoring in an amount ranging from 0.5 to about 2% by weight of the final chewing gum product. The flavoring may comprise synthetic flavors and oils derived from plants, leaves, flowers, fruit, etc. Representative fruit flavor adjuncts include acids, such as adipic, citric, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

By utilizing a single compatibilizing agent for both the primary components, the properties of the ultimate gum product can be carefully selected based on the inherent attributes of the component, using other additives to merely enhance, optimize or fine tune the qualities attained by the combination of primary components.

EXAMPLES OF THE INVENTION

Samples of polyblends suitable for use as gum base were prepared which included three parts of polyvinylacetate resin to one part of styrene-butadiene rubber (SBR), or polyisobutylene, to two parts compatibilizing agent. The ingredients were charged to a 60 cc Brablender mixing bowl fitted with #6 roller blades and mixed 2 to 6 hours at 90° C. until the components appeared to be adequately mixed.

Compatibilizing agents were selected by use of the solubility parameter theory. Compatibilizers having a solubility parameter combination in the "9" range were chosen for PIB/PVAc and compatibilizers having a solubility parameter in the "9.7" range were selected for SBR/PVAc combination.

Authorities use various criteria for compatibility, i.e., clarity, heat capacity (merging of separate Tg peaks or melting points), X-ray scattering, thermal expansion vs temperature and dielectric or mechanical measurements. Clarity is not altogether reliable since very small amount of an incompatible or poorly dispersed phase can cause opacity. Conversely domains smaller than approximately 1000 angstroms will likely be invisible. Refractive index differences of less than 0.01 will cause domains to be invisible. Variations of light transmission would include light scattering measurements, and electron microscope work, especially if one of the phases can be etched or otherwise marked. We have had fair luck with phase microscopy. Simple physical properties are affected by compatibility, i.e., elongation will likely be low if the blend is largely incompatible.

However, for the purpose of making gum base light transmission provides a fairly good indication of adequate compatibility. Accordingly, the gum base mixes were press molded at 70° C. to a thickness of approximately 25 mils.

The resulting sheet was tested for light transmission by placing the sheet between a photocell and light source. The light source was adjusted to yield 100 milliamps on a digital ammeter connected directly to the photocell. The reading after the molded gum base was placed on the bracket between cell and light source was substracted from the reading without molded gum base.

The lower the reported reading (Tables I, II), the better the light transmission. The better the light transmission, the better the compatibilization of the three ingredients barring complications, i.e., small amounts of particles in the wave length of light (approximately 0.2 microns), particles smaller or much larger than the wave length of light, good refractive index matching, etc.

Portions of the sheet were then tested for elongation of room temperature, 98° F., and 98° F. after one hour in water. Other observations soft, stiff, tacky, etc. were also recorded. After storage of the sheet, exudation, if any, was noted. Results are tabulated, Tables I and II.

TABLE I

| | | | Evaluation of PVAc/SBR/Compatibilizer | | | | |
|---|---|---|---|---|---|---|---|
| | | Solubility | Light Transmission | | Comment | | |
| Sample | Compatibilizer | Parameter | Loss ($m^a$) | Elongation | 70° F. Dry | 98° F. Dry | 98° F. Wet |
| A | PlastHall P-530 (Polypropylene glycol glutarates) | 10.1 | 36 | OK | So,T | So,T | So |
| B | Resoflex R-296 (Polyester) | — | 28 | OK | F,So,T | F,So,T | F,So |
| C | Polyol D-510 (Calprolactone) | 9.5 | 29 | OK | So,T | So,T | F,So,T |

(1) C — crumbly
Cf — cold flow
Ex — exudation
F — fibrous on elongation
(2) Cambridge Industries

TABLE II

| | | | Evaluation of PVAc/SBR/Compatibilizer | | | | |
|---|---|---|---|---|---|---|---|
| | | Solubility | Light Transmission | | Comment | | |
| Sample | Compatibilizer | Parameter | Loss ($m^a$) | Elongation | 70° F. Dry | 98° F. Dry | 98° F. Wet |
| D | Plastolene | 9.5 | 8.0 | Marginal 98° F. Wet | C,St,T | C,St,T | St |

TABLE II-continued

| | | Evaluation of PVAc/SBR/Compatibilizer | | | | |
|---|---|---|---|---|---|---|
| | | Solubility | Light Transmission | | Comment | | |
| Sample | Compatibilizer | Parameter | Loss (m$^a$) | Elongation | 70° F. Dry | 98° F. Dry | 98° F. Wet |
| | 9789 Polypropylene glycol azelate | | | | | | |

(1) C — crumbly
Cf — cold flow
Ex — exudation
F — fibrous on elongation
So — soft
St — stiff
T — Tacky PlastHall P-530 Caprolactone and Resoflex R-296 were found to be satisfactory polymeric compatibilizers for the PVAc/SBR base, which, of course, will not migrate out of the base because of volatility. Other polymers which are believed to be suitable include poly 1, 3-butylene glycol adipate, polypropylene glycol azelate and polypropylene glycol adipate.

Relative to the PVAc/PIB base, Plastolene 9789 was shown to have desirable characteristics. It is presently believed that liquid polymeric material having a solubility parameter of 9.0 is the best single component compatibilizer.

Generally, it is presently believed that gum base formulations having a ratio of about 3.0:1.0:2.0 by weight of resin:elastomer:compatibilizing agent provide a workable combination. However, since these proportions will vary depending on the nature of the different components used, the scope of the invention is not to be limited by the preferred ratio set forth above. Primary importance is the fact that a gum base can be prepared wherein the primary ingredients of a resin and an elastomer are made compatible for purposes of forming a workable base by use of a single polymeric compatibilizing agent which does not migrate from the base during storage or as a result of mastication.

Chewing gum compositions are prepared utilizing the novel polyblend base in accordance with the following formula:

| Ingredient | Parts by Weight of the Chewing Gum |
|---|---|
| Novel Polyblend Base | 10.0% to 30.0% |
| Bulk Sweetener | 0% to 60.0% |
| Liquid Syrup | 5.0% to 25.0% |
| Filler | 0% to 25.0% |
| Intensive Sweetener | 0% to 2.0% |
| Flavor | 0.1% to 1.0% |
| Coloring Agent | 0% to 0.5% |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a chewing gum which has excellent texture and shelf life.

It will be appreciated that as a result of eliminating the need for compatibilizers for each of the resin and the elastomer, undesirable characteristics normally associated with such components and considerations relative to the ability to use other components as a result of such compatibilizers are also eliminated. This of course gives the artisan greater flexibility in producing a particular gum with desired characteristics.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

We claim:

1. A homogeneous gum base composition consisting essentially of, in weight %,
   about 5 to 75% of polyvinyl acetate resin
   about 3 to 30% of elastomer selected from the group consisting of styrene-butadiene copolymer and polyisobutylene,
   about 0.5 to 50% of a polymer selected from the group consisting of
   ethylene-vinyl acetate copolymer,
   polyethylene adipate
   poly 1,4 butylene adipate
   poly 1,3 butylene glycol adipate,
   polypropylene glycol glutarate,
   polypropylene glycol adipate, and
   polypropylene glycol azelate
   about 0 to 60% of inorganic filler
   about 0 to 18% of wax
   about 0 to 10% of hydrogenated vegetable or animal fat
   about 0 to 10% of emulsifier
   about 0 to 10% of ester gum
   and, optionally, colorant, pigment and antioxidant.

2. A chewing gum including the gum base of claim 1.

3. The chewing gum of claim 2 which further comprises sweeteners selected from the group consisting of monosaccharides, disaccharides, intense sweeteners of artificial or natural origin, sugar alcohols, hydrogenated starch hydrolysates, corn syrup, and mixtures thereof.

4. A homogeneous gum base composition as in claim 1 wherein said polymer is ethylene-vinyl acetate copolymer.

5. A homogeneous gum base composition as in claim 4 wherein said elastomer is polyisobutylene.

6. A homogeneous gum base composition as in claim 4 wherein said elastomer is styrene-butadiene copolymer.

7. A homogeneous gum base composition as in claim 1 wherein said polymer is polypropylene glycol glutarate.

8. A homogeneous gum base composition as in claim 7 wherein said elastomer is polyisobutylene.

9. A homogeneous gum base composition as in claim 8 wherein said elastomer is styrene butadiene copolymer.

10. A homogeneous gum base composition as in claim 1 wherein said polymer is polypropylene glycol azelate.

11. A homogeneous gum base composition as in claim 10 wherein said elastomer is polyisobutylene.

12. A homogeneous gum base composition as in claim 10 wherein said elastomer is styrene butadiene copolymer.

13. A homogeneous gum base composition as in claim 1 consisting essentially of
   about 20 to 50% of polyvinyl acetate resin
   about 10 to 20% of styrene butadiene copolymer, and
   about 3 to 28% of said polymer.

14. A homogeneous gum base composition as in claim 1 consisting essentially of
   about 20 to 50% of polyvinyl acetate resin
   about 10 to 20% of polyisobutylene, and
   about 3 to 28% of said polymer.

15. A homogeneous gum base composition as in claim 1 in which said resin, said elastomer and said polymer are employed in a weight ratio, to each other, of, respectively, 3:1:0.5-2.0.

16. A homogeneous gum base composition as in claim 13 or 34 further comprising:
   about 5 to 45% of inorganic filler
   about 3 to 12% of wax
   about 0.5 to 7% of hydrogenated vegetable or animal fat, and
   about 3 to 9% of emulsifier.

17. A method of producing a homogeneous gum base comprising
   bringing together in a mixing device components consisting essentially of, by weight,
   about 5 to 75% of polyvinyl acetate resin,
   about 3 to 30% of elastomer selected from the group consisting of styrene-butadiene copolymer and polyisobutylene,
   about 0.5 to 50% of, as a polymeric compatibilizing agent, a polymer selected from the group consisting of
   ethylene-vinyl acetate copolymer
   polyethylene adipate
   poly 1,4 butylene adipate
   poly 1,3 butylene glycol adipate
   polypropylene glycol glutarate
   polypropylene glycol adipate, and
   polypropylene glycol azelate,
   about 0 to 60% of inorganic filler,
   about 0 to 18% of wax,
   about 0 to 10% of hydrogenated vegetable or animal fat,
   about 0 to 10% of emulsifier,
   about 0 to 10% of ester gum,
   and, optionally, colorant, pigment and antioxidant,
   said compatibilizing agent being adapted to plasticize said resin and said elastomer so that said resin and said elastomer are made physically compatible with each other; and
   mixing said components so as to plasticize said resin and said elastomer with said compatibilizing agent and to form a single homogeneous gum base mass.

18. The method of claim 17 wherein another phase of components is added to said homogeneous gum base to obtain desired product characteristics.

* * * * *